UNITED STATES PATENT OFFICE.

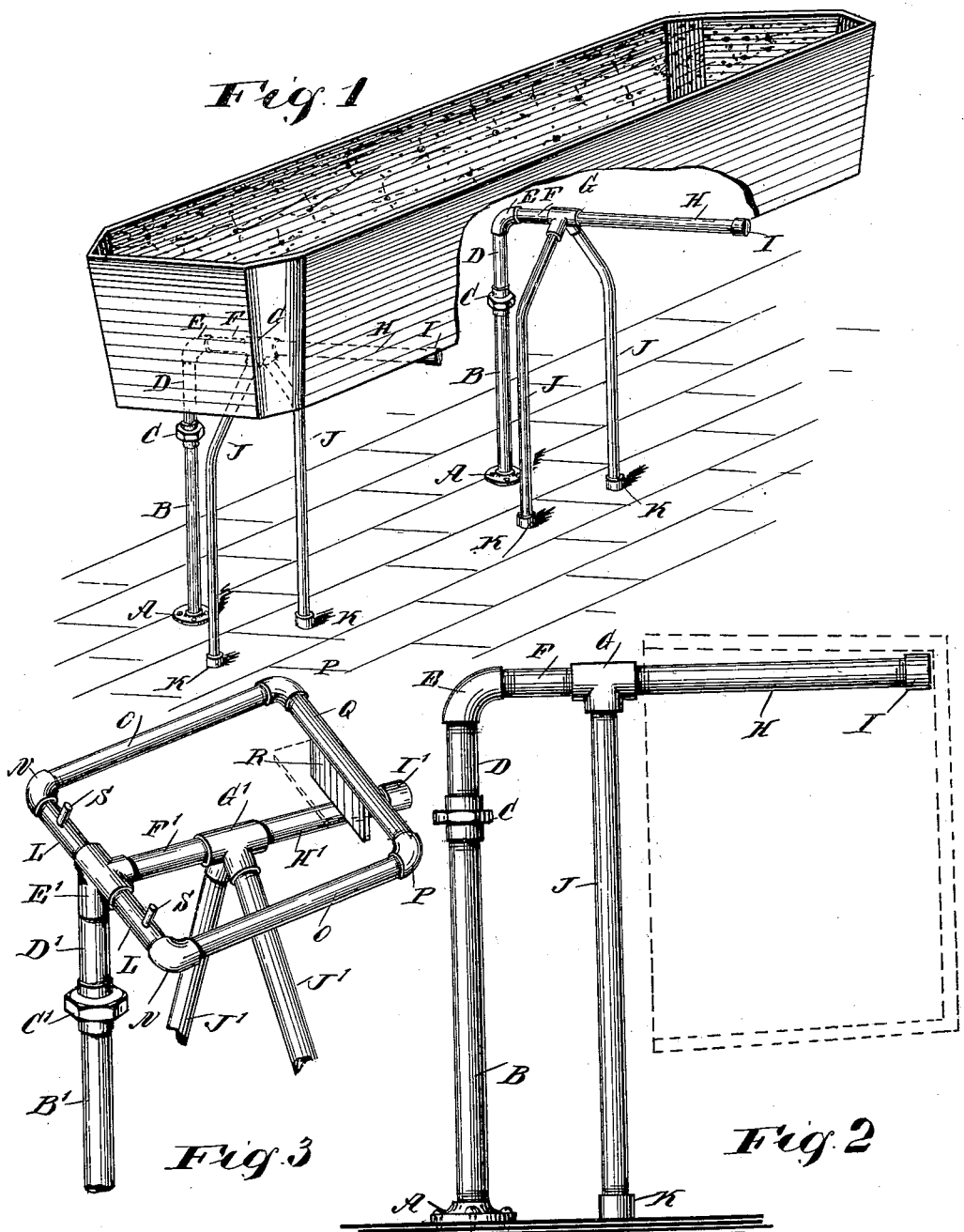

ARCHIBALD KERR, OF CARMICHAEL, PENNSYLVANIA.

TRESTLE.

SPECIFICATION forming part of Letters Patent No. 626,911, dated June 13, 1899.

Application filed November 30, 1898. Serial No. 697,837. (No model.)

*To all whom it may concern:*

Be it known that I, ARCHIBALD KERR, of Carmichael, in the county of Greene and State of Pennsylvania, have invented a new and Improved Trestle, of which the following is a full, clear, and exact description.

The object of the invention is to provide a trestle of novel, simple, durable, and inexpensive construction and which affords means for the convenient temporary support of various articles, more particularly burial caskets or coffins, so that an operator may have free access to all parts of the coffin or casket, and thus be enabled to trim the inner and outer surfaces of the same in an expeditious manner, the trestle being also adapted for supporting type-setters' cases and various other articles to be operated upon or trimmed.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the views.

Figure 1 is a perspective view of a pair of the improved trestles arranged for supporting a coffin or casket. Fig. 2 is an enlarged side elevation of one of the trestles, a casket or coffin being indicated in dotted lines as supported on said trestle; and Fig. 3 is a perspective view of a modified form of the trestle arranged for supporting type-setters' cases or the like.

As illustrated in Fig. 1, two trestles, both alike in construction, are employed for supporting a coffin or casket, and each trestle is provided with a floor-plate A, adapted to be fastened to the floor by screws or other devices. In the floor-plate is screwed a post B, supporting at its upper end a union C, carrying a short pipe D, provided with an elbow E, from which extends horizontally a pipe F, carrying a four-way T G, from which extends a horizontal support H, closed at the outer end by a cap I. The T G also supports angular legs J, provided at their lower ends with caps K, adapted to rest on the floor.
It will be seen by the arrangement described that the L-shaped support, consisting of the pipes H and F, the elbow E, and the pipe D, is mounted to turn on the upper end of the post B by means of the unions C to permit of swinging the said L-shaped support into any desired position. For instance, as shown, the two supports are swung parallel to each other to conveniently support the casket or coffin either by placing the casket on the pipes H on either the bottom or sides or hanging the casket on the pipes at the caps I, as indicated in dotted lines in Fig. 2. Thus by the arrangement described the operator is enabled to have ready access to any part of the casket, inside or outside, to permit of fastening the desired trimmings—such as linings, handles, ornaments, &c.—on the coffin or casket.

By providing the legs J a proper bracing is given to the L-shaped support to relieve the unions C of undue strain.

When the device is not in use, the post B can be readily unscrewed from the floor-plate A to permit of storing the trestle, with the exception of the floor-plate, in a convenient place in the shop or other place where the device is used.

It is understood that the several parts B, D, F, H, and J are made of tubing, so as to render the device as light as possible and yet have the necessary stability.

In the arrangement shown in Fig. 3 the post B' is provided with a union C', carrying a pipe D', on which screws a four-way T E', carrying a pipe F', on which is secured a four-way T G', supporting a pipe H', having a cap I', and also supporting legs J'. The four-way T E' is provided with transverse pipes L, suppporting L's N at their outer ends, and said L's are connected by pipes O with L's P, connected with each other by a pipe Q to complete a rectangular frame moving with the L-shaped support mounted on the union C'. The pipe Q freely turns in the L's P and is provided on the under side with a plate R, adapted to rest on the top of the pipe H', so as to hold the rectangular frame in an inclined position; but when it is desired to move the frame into an approximately horizontal position the pipe Q is turned so that the plate R lies flat on the pipe H' and the pipe Q rests directly on said pipe H'. The pipes L loosely screw in the T E' and are provided with pins S for forming a support for the type-casing to be supported on the rectangular frame.

It will be further seen that by having the union C the post B can be readily screwed in the floor-plate without swinging the entire support around, and it will also be seen that when the casket is supported on the pipe H, as shown in Fig. 2, the handles and ornaments already secured to the now bottom side of the casket do not come in contact with any part of the trestle and hence are not liable to be injured.

Having thus fully described my invention, I claim as new and desire to secure by Letters Patent—

1. A trestle, provided with a post, a union on the upper end of the post, an L-shaped support having its vertical member connected with the union and having its horizontal member arranged to support the article to be operated upon or trimmed, and angular legs carried by the horizontal member of said support and adapted to rest on the floor, substantially as shown and described.

2. A trestle, provided with a post, a union on the upper end of the post, an L-shaped support having its vertical member connected with the union and having its horizontal member arranged to support the article to be operated upon or trimmed, angular legs carried by the horizontal member of said support and adapted to rest on the floor, and a rectangular frame carried by said support, two of the arms of the frame being mounted to be turned, and one of said arms carrying a plate and the other arm carrying pins, substantially as shown and described.

3. A trestle, comprising a post, a support having a vertical member mounted to turn on the upper end of the post and a horizontal member arranged to support the article to be operated upon or trimmed, a rectangular frame carried by said support and adapted to be moved into an inclined position, and means for supporting the said frame in the inclined position, substantially as described.

4. A trestle, provided with a post, a support having a vertical member mounted to turn on the upper end of the post and a horizontal member arranged to support the article to be operated upon or trimmed, and angular legs connected at their upper ends to a T carried by the horizontal member of the said support, said legs being provided at their lower ends with caps adapted to rest on the floor, substantially as shown and described.

ARCHIBALD KERR.

Witnesses:
CHARLES W. BARKMAN,
HU. I. KEYS.